United States Patent [19]

Hoogenboom et al.

[11] Patent Number: 4,710,808
[45] Date of Patent: Dec. 1, 1987

[54] MACHINE VISION DIFFERENTIAL MEASUREMENT SYSTEM

[75] Inventors: Leo Hoogenboom, Ballston Spa; Robert L. Jackson, Jr., Schenectady; Russell P. Kraft, Averill Park; Alan M. Offt, Clifton Park, all of N.Y.

[73] Assignee: Mechanical Technology Incorporated, Latham, N.Y.

[21] Appl. No.: 893,220

[22] Filed: Aug. 5, 1986

[51] Int. Cl.[4] .............................................. H04N 7/18
[52] U.S. Cl. .................................. 358/107; 356/381; 364/563
[58] Field of Search .................. 358/107, 106, 93; 356/381; 364/563

[56] References Cited

U.S. PATENT DOCUMENTS

| | | | |
|---|---|---|---|
| 3,187,185 | 6/1965 | Milnes | 358/107 |
| 3,619,070 | 11/1971 | Pirlet | 356/381 |
| 3,671,726 | 6/1972 | Kerr | 356/381 |
| 3,736,968 | 6/1973 | Mason | 144/312 |
| 4,192,612 | 3/1980 | Bodlaj | 356/381 |
| 4,375,921 | 3/1983 | Morander | 356/381 |
| 4,498,778 | 2/1985 | White | 358/107 |
| 4,564,296 | 1/1986 | Oshida | 356/381 |

Primary Examiner—Howard W. Britton
Attorney, Agent, or Firm—Joseph V. Claeys; Joseph C. Sullivan

[57] ABSTRACT

In the present system, the thickness of an object with two surfaces is determined by forming two geometric images on the surfaces in a superimposed relationship. The images are viewed by two video cameras and their relative positions with respect to two corresponding references are determined. These relative positions are used to measure the thickness of the object.

4 Claims, 10 Drawing Figures

MACHINE VISION DIFFERENTIAL MEASUREMENT SYSTEM

BACKGROUND OF THE INVENTION a. Field of Invention

This invention pertains to a system for measuring a particular dimension of an object, and more particularly to the non-contact measurement of the differential thickness of a relatively thin object by automated means.

b. Description of the Prior Art

As stronger and lighter materials are being developed, it has become possible to use very thin sheets of such materials in various application where previously much thicker and heavier materials were necessary. For example, cans for dispensing various popular beverages to the general public are made of much thinner sheet metals than in the past. With this development there arose a need for equipment capable of making very small non-contact measurements for quality control, and more particularly for differential thickness measurements. Heretofore such measurements could only be made by making physical contact with the article to be measured. However, this type of testing was labor intensive, slow and inaccurate.

The following references are illustrative of the state of the art:

U.S. Pat. No. 4,498,778 to White discloses a method and device for measuring the spatial coordinates of a workpiece by illuminating the workpiece with a planar light source generating an electronic image of the workpiece and analyzing the image with a computer. Only one surface of the workpiece is illuminated and the features of the image used for analysis correspond to various features of the workpiece itself.

U.S. Pat. No. 3,736,968 to Mason discloses a method and apparatus for positioning logs, in which the dimensions of a log are determined by illuminating the log with two facing light sources 135, 136 and analyzing the light reflected therefrom.

U.S. Pat. No. 3,187,185 to Milnes discloses a device for determining the contour of a sheet of steel. Two beam sources generate two straight lines on the same side of a sheet. The distance between the lines indicates the thickness of the sheet. Two other beam sources are used to generate two more lines on the opposite sheet surface. The configuration of the lines, when superimposed yields information on the sheet contours. However the distance between lines dispersed on opposite sides of the sheet is not indicative of the thickness of the sheet.

OBJECTIVES AND SUMMARY OF THE INVENTION

In view of the above, it is an objective of the present invention to provide a system for determining the thickness of an object without requiring physical contact.

Another objective is to provide a means of determining a differential thickness with a great degree of precision.

A further objective is to provide a system of determining thickness which is completely automated so that no human intervention is required.

In the present invention structured light from two sources is projected along a common axis at opposite surfaces of an object. Preferably, these surfaces extend in parallel to each other and at a preselected acute angle with respect to the projection axis. The images formed by the two sources of structured light are monitored by two imaging means such as video cameras which are provided to detect the distance from a feature of each of the images to a reference point. The thickness of the object is proportional to the sum of the distances if the reference point is within the sheet of material. If it is not, then the thickness is the difference of the distances. Other objectives and advantages shall become apparent from the following description of the invention.

DETAILED DESCRIPTION OF THE INVENTION

Figure 1:
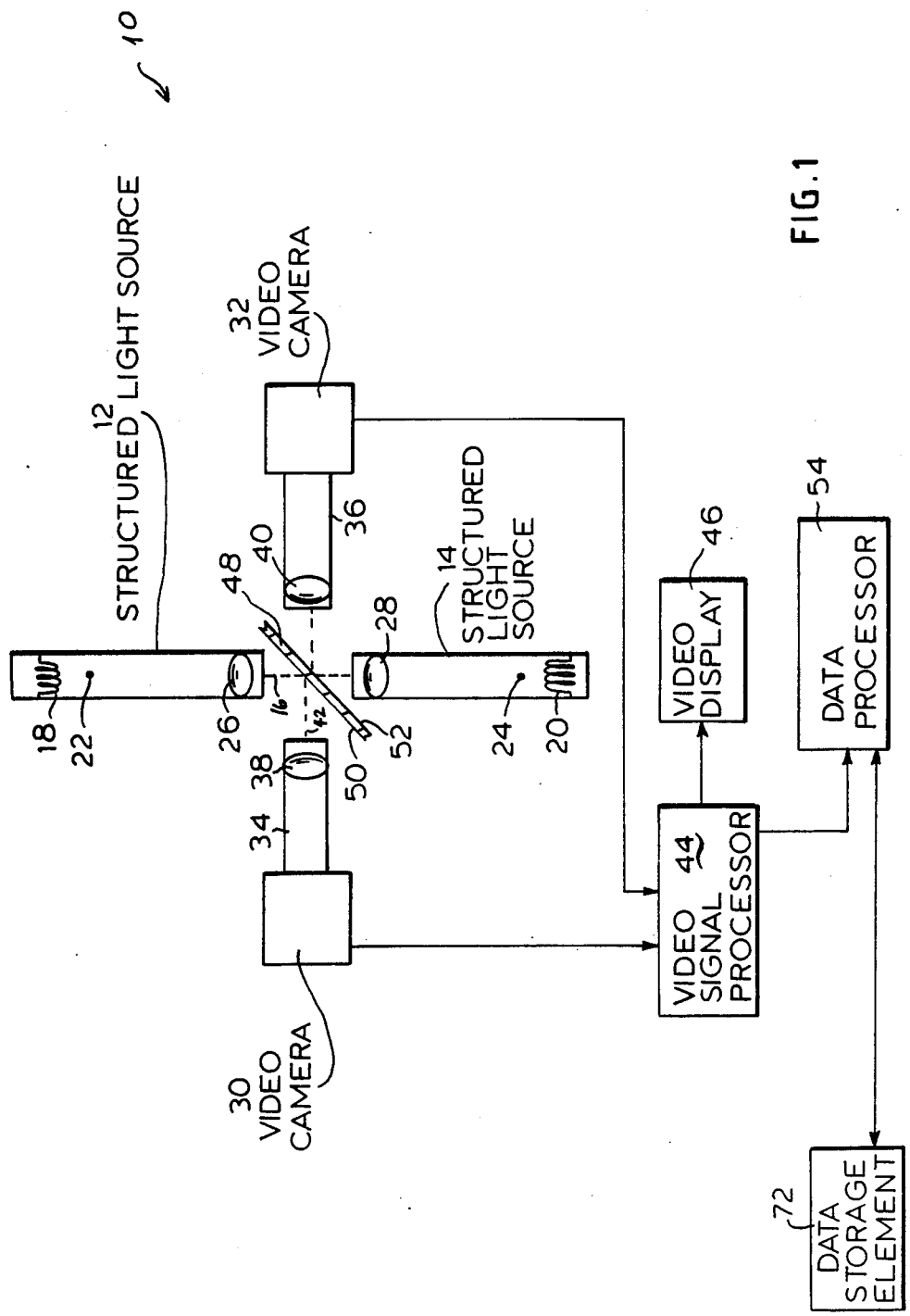
FIG. 1 shows the elements of a system for a differential measurement constructed in accordance with the invention.

Referring now to the Figures and more particularly to FIG. 1, a system for non-contact differential thickness measurement comprises first and second structured image sources 12, 14 disposed and arranged to transmit structured light toward each other along a common axis 16. The sources include light generators 18, 20, imaged objects 22, 24 and projection lenses 26, 28 respectively. For example, the light generators may include incandescent filaments. The imaged objects are constructed and arranged to generate an image of relatively small dimensions. Each object may comprise a straight wire or means having a narrow slit opening, such as a narrow slit in a foil of metal or other suitable material, disposed perpendicularly to axis 16 and having a diameter or width of about 0.001 inches and 0.0002 inches respectively.

The system 10 also includes two video cameras 30, 32 each having an extension tube 34, 36 with camera lenses 38, 40. The extensions 34, 36 are positioned along a common axis 42 perpendicular to axis 16 in a facing relationship. Each camera is a high resolution camera capable of producing 512×512 pixels. In one specific case, for example, the extensions give each camera a very limited range of field of about 0 015" whereby each camera has a resolution of about 30 millionths of an inch per pixel.

Cameras 30, 32 produce video signals which are sent to a common video signal processor 44. The processor after suitable signal conditioning displays the images from each camera on a video display 46.

The object 48 to be measured, is placed at the intersection of axes 16, 42 as shown. This object has two substantially parallel surfaces 50, 52 which are at acute angles with respect to the axes. Structured light from source 12 forms an optical image on face 50 which is converted into corresponding video signals by camera 30. Similarly, an image is formed by source 14 on surface 52 which is converted into video signals by camera 32. These video signals are used by the processor 44 to measure the thickness of object 48. This information is transmitted to an automated data processor 54.

Figure 2:
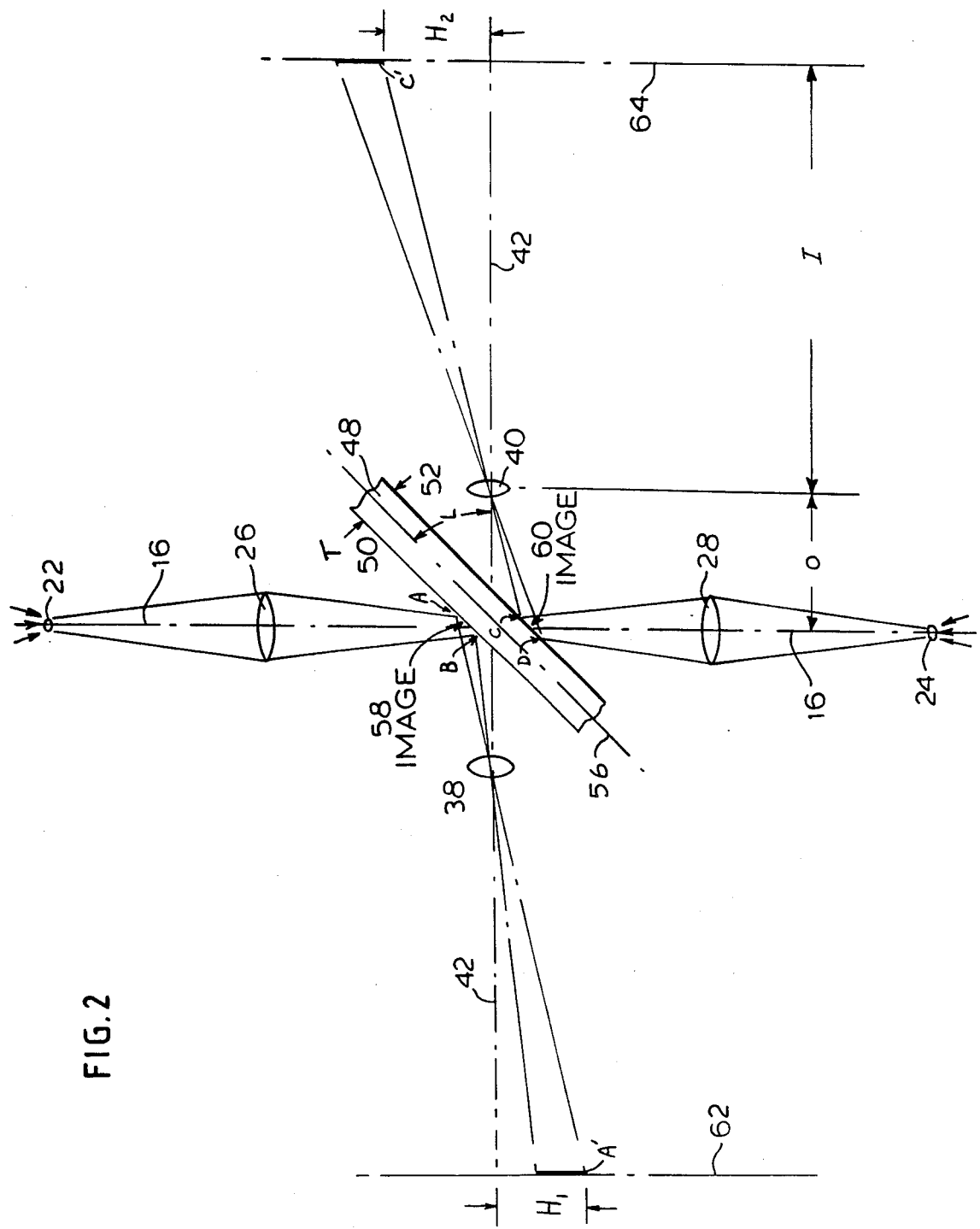
FIG. 2 shows the optical paths used by the system of FIG. 1.

More particularly, as shown in FIG. 2, object 48 is placed with its longitudinal axis 56 forming an angle L with axis 42 which may be about 45°. The image of wire or slit 22 is projected by lens 26 on object surface 50 to form a dark or light area 58 delimited by points A,B. That is, a dark area is formed when a wire is used and a light area is formed when the slit is used. Similarly, the image of the wire or slit 24 is projected by lens 28 to form a dark or light area 60 delimited by points C, D.

Video cameras 30,32 have two image planes 62, 64 disposed perpendicularly to axis 42. On image plane 62 the image of point A is indicated by point A' and similarly the image of point C is indicated by point C' on image plane 64 of camera 32. Thus, point A' is at a distance of $H_1$ while point C' is at a distance of $H_2$ from axis 42. The distance between points A and C is related to the thickness T between surfaces 50 and 52 by the formula:

$$T = AC \cos L$$

Therefore:

$$T = (O/I)(H_1 + H_2) \cos L$$

where O is the distance between lens 40 (as well as lens 38) and axis 16, and I is the distance between lens 40 and image plane 64 (or image plane 62 to lens 38).

Video signal processor 44 therefore first determines the exact location of points A', C' from the video signals received from cameras 30, 32 and then determines distances $H_1$, $H_2$ as well as thickness T as discussed above. For very accurate measurements, the system is first calibrated by first measuring the thickness of one or more objects which has been previously determined by other means.

The manner in which processor 44 determines the exact location of the points $A^1$ and $C^1$ shall now be described.

Figure 3A:
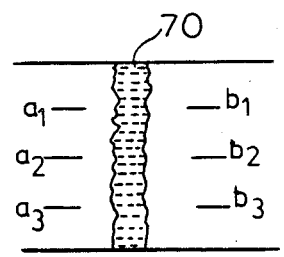
FIG. 3A illustrates the image of the structured light pattern.
Figure 3B:
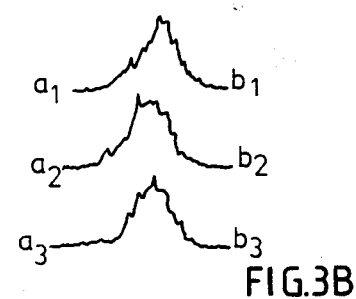
FIG. 3B illustrates light intensity profiles along three arbritary line segments along the structured light pattern of FIG. 3A.

FIG. 3A shows the image of the structured light pattern 70 for a wire as acquired by the video signal processor 44. A typical image of the structured light line on a practical target such as a metal surface is characterized by random variations in the intensity profile which are illustrated in FIG. 3B. The three traces in FIG. 3B show light intensity versus position along three arbitrary line segments a1b1, a2b2, a3b3 shown in FIG. 3A across the structured light pattern 70. The random transversal irregularities and offsets are due to surface imperfections in the target material and other effects. This makes a high precision determination of the center of the structured light pattern very difficult, as explained below.

Figure 4A:
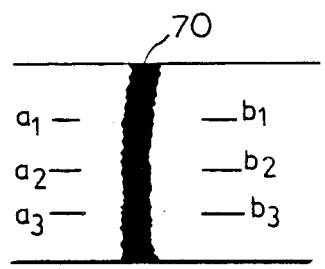
FIG. 4A illustrates the image of the structured light pattern after simple binary threshold processing.
Figure 4B:
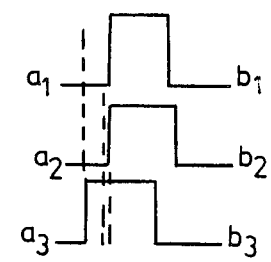
FIG. 4B illustrates intensity profiles along three arbitrary line segments of the structured light pattern of FIG. 4A.

If the processor employs a simple binary threshold detection circuit, the image of FIG. 3A is effectively converted into the black and white image of FIG. 4A. Due to the surface irregularities noted above, the center of this feature is not defined precisely. FIG. 4B illustrates examples of intensity profiles at three arbitrary locations and shows that the center of the feature is dependent on where the analysis is made. Other forms of conventional image processing, such as gray scale analysis, edge detection, or the like, yield similar variability in results.

While these methods are useful and adequate for many applications, it is often necessary or desirable to provide for a higher degree of precision.

Figure 5A:
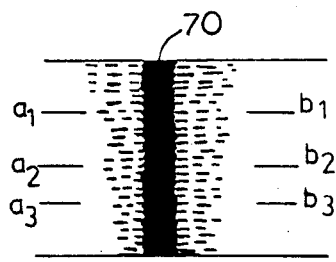
FIG. 5A illustrates the image of the structured light pattern after suitable vertical filtering.
Figure 5B:
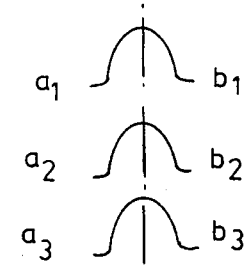
FIG. 5B illustrates intensity profiles along these arbitrary line segments of the structured light pattern of FIG. 5A.

In accordance with another aspect of the invention much higher precision is achieved by the use of a method employing suitable vertical filtering of the structured light pattern, storing a reference intensity profile, and correlating this stored intensity profile in the horizontal direction. To this end, a vertical filtering operation is performed on the image to average information contained in the structured light pattern in a preferential direction along the light pattern (i.e. along the length of pattern 70) thereby eliminating the transversal irregularities and offsets mentioned above. FIG. 5A shows the result of this processing. FIG. 5B shows intensity across three arbitrary sections of the structured light pattern. The intensity profile is now independent of the position along the structured light pattern. The peak of one of these curves can then be determined to define the center of the structured light feature.

Figure 6A:
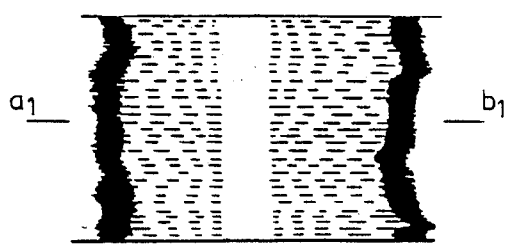
FIG. 6A illustrates an expanded view of the structured light pattern image after suitable vertical filtering and correlation with a stored reference.
Figure 6B:
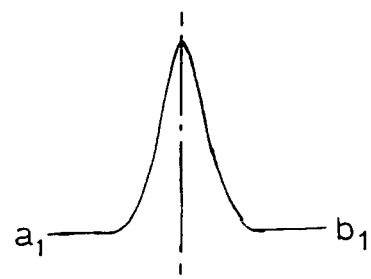
FIG. 6B illustrates an intensity profile across the processed and correlated light pattern of FIG. 6A.

To further improve the precision, a correlation operation is used. In this operation, an intensity profile similar to that in FIG. 5B is derived from a reference target surface and stored in a data storage element 72 associated with data processor 54 (shown in FIG. 1). In the measurement of new targets, this profile is correlated in the horizontal direction with the image of FIG. 5A. FIG. 6A illustrates the result of this correlation with the magnitude of the correlation function displayed as intensity, such display being black at the edges and transitioning to white at the point of maximum correlation. FIG. 6B shows an intensity profile across this image. The peak of this function represents the point of maximum correlation between the stored reference and the current image and is used to define the location of the original structured light feature. The advantage of this approach is that the function has much greater selectivity and, therefore, greater precision than any of the other described methods.

In many applications, such as quality control, it is important to determine the variation in the thickness of the object at several different locations. Therefore, the processor may be adapted to take several measurements, the object being shifted slightly after each measurement. The several measurements are then averaged by the processor by performing a digital low frequency filtering operation. The several measurements may also be correlated against a known profile of the object. Obviously, numerous modifications may be made by one skilled in the art without departing from the spirit and scope of the invention as defined in the appended claim.

We claim:

1. A system for measuring a dimension of an object along a predetermined axis said object having a first and a second surface defining said dimensions, comprising:

projecting means for projecting first and second features on said first and second surfaces respectively along a first axis;
imaging means for projecting first and second features on first and second planes respectively along a second axis;
said first and secnd axis being perpendicular and said object being placed at an intersection between said first and second axis, with said predetermined axis forming an acute angle with said second axis; and
processing means for determining the distances between said features and corresponding reference points on said planes, and for determining said dimensions in accordance with said distances;
said projecting means including a first and a second structured light source, each said sources having a light generating element, an imaging element and a projection lens for projecting a reference image from said element along said first axis and
wherein the imaging element comprises a wire disposed perpendicularly with respect to said first axis wherein said first and second features are elongated dark features.

2. A system for measuring a dimension of an object along a predetermined axis said object having a first and a second surface defining said dimensions, comprising:
projecting means for projecting first and second features on said first and second surfaces respectively along a first axis;
imaging means for projecting first and second features on first and second planes respectively along a second axis;
said first and second axis being perpendicular and said object being placed at an intersection between said first and second axis, with said predetermined axis forming an acute angle with said second axis; and
processing means for determining the distances between said features and corresponding reference points on said planes, and for determining said dimensions in accordance with said distances;
said projecting means including a first and a second structured light source, each said sources having a light generating element, an imaging element and a projection lens for projecting a reference image from said element along said first axis; and
wherein the imaging element comprises means having a narrow slit opening therein disposed perpendicular to said first axis wherein said first and second features are elongated light features.

3. A system for measuring a dimension of an object along a predetermined axis said object having a first and a second surface defining said dimensions, comprising:
projecting means for projecting first and second features on said first and second surfaces respectively;
imaging means for projecting first and second features on first and second planes respectively;
processing means for determining the distances between said features and corresponding reference points on said planes, and for determining said dimensions in accordance with said distances;
at least one of the objects being elongated in a direction, said processing means filtering the image of said one object along said direction to generate said filtered image; and
wherein said processing means includes storage means for storing an intensity profile of one of said first and second surfaces.

4. The system of claim 3 wherein said processing means correlates said filtered image with said intensity profile to generate a peak corresponnding to a center of said one image.

* * * * *